(No Model.)

H. TWIST.
HOPPLE.

No. 450,650. Patented Apr. 21, 1891.

Witnesses.
R. G. Amies
Bronk King

Inventor
Hiram Twist
per Hallock and Hallock
Att's.

United States Patent Office.

HIRAM TWIST, OF ERIE, PENNSYLVANIA.

HOPPLE.

SPECIFICATION forming part of Letters Patent No. 450,650, dated April 21, 1891.

Application filed August 30, 1886. Serial No. 212,223. (No model.)

*To all whom it may concern:*

Be it known that I, HIRAM TWIST, a citizen of the United States, residing at Erie, in the county of Erie and State of Pennsylvania, have invented certain new and useful Improvements in Hopples; and I do hereby declare the following to be a full, clear, and exact description of the invention, such as will enable others skilled in the art to which it appertains to make and use the same.

This invention consists in certain improvements in the construction of fetter-locks for hopples, or other fetters for animals, by which, in case the animal becomes tangled or cast, the hopple can be instantly released and relieve the animal from danger of injury.

Figure 1:
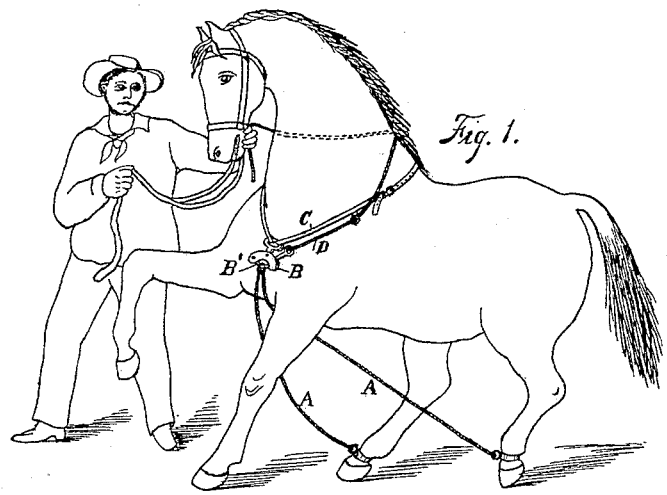
Figures 2, 3:
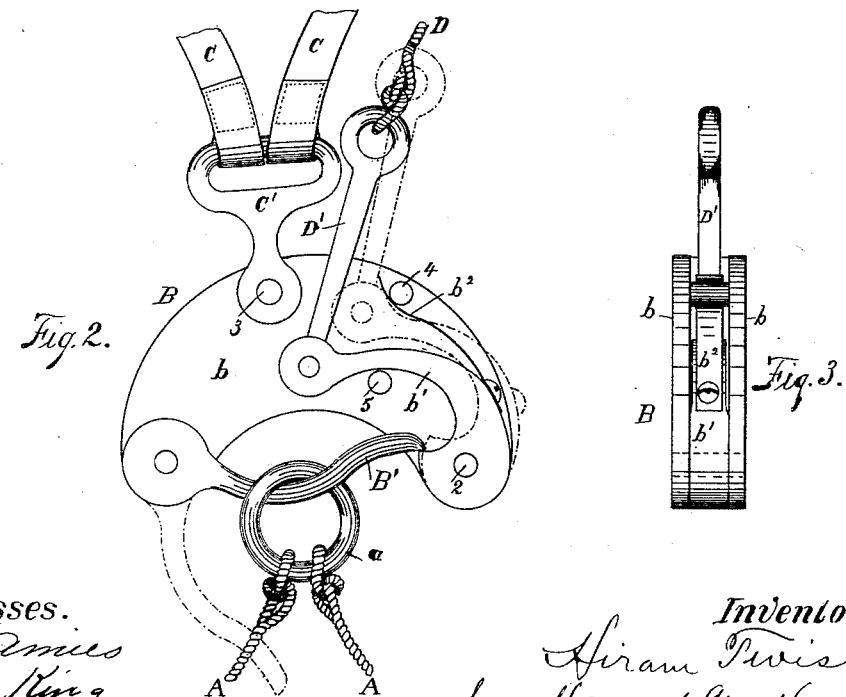

My invention is illustrated in the accompanying drawings, as follows:

Figure 1 shows the hopple in use on a horse. Fig. 2 is an elevation of my hopple, parts being broken away and one of the side plates of the releasing device removed, showing the internal construction. Fig. 3 is a side elevation looking from the right of Fig. 2.

The releasing device in general appearance somewhat resembles a padlock. It is attached to the neck-strap C, so as to hang over the chest of the animal. It has a tongue or shackle somewhat like a padlock, which hooks into the ring $a$, to which the hopple-straps A A are attached. If the hopple-straps A A are on the fore feet of the animal, the releasing device would be on the neck-strap C, and it may be attached there when said straps are on the hind feet, as shown.

The construction of the releasing device is as follows: It consists of a body or frame B, formed of two plates $b\ b$, connected by studs 1, 2, 3, 4, and 5 and separated far enough to receive the other parts between them. These plates have the general form of a crescent. In one horn of the crescent is pivoted on the stud 1 the tongue or shackle B′, which curves in an opposite direction to the crescent and spans the space between the horns. In the opposite horn on the stud 2 is pivoted a catch-lever $b'$, with which the end of the tongue engages. This lever extends to the central part of the body, and its movement is limited by the studs 4 and 5, and it is provided with a spring $b^2$, which bears on the stud 4. To this lever is connected a link D′, which extends out of the body and terminates in an eye, to which the releasing-cord D is attached. A loop C′ is pivoted on the stud 3, and to this loop is fastened the neck-strap C, or any other strap by which it may be supported in proper place on the animal.

By observing Fig. 2 it will be seen that when the releasing-cord D is pulled the catch-lever will be drawn into the position shown by dotted lines, and this will release the tongue B′.

The manner of using the hopple is fully shown in Fig. 1, and needs no explanation.

I am aware that chain-locks have been made having a construction somewhat like my releasing device—as, for example, see Patent No. 120,619, of November 7, 1871, to L. F. Chase—and I shall therefore not broadly claim the combination of elements there shown.

I am also aware that hopples similar to the one I here show are common, except that a releasing device has not been used in them—as, for example, see Patents Nos. 54,887, 78,082, and 216,705.

What I claim as new is—

The combination of the leg-straps having the forward end secured to a loop, a neck-strap the ends of which are secured to a loop supporting a plate B, said plate B having a tongue or shackle B′, pivoted at one end to the plate, which is also provided with a catch-lever engaging with the free end of the tongue or shackle B′, and a releasing-cord secured to said catch-lever.

In testimony whereof I affix my signature in presence of two witnesses.

HIRAM TWIST.

Witnesses:
ROBT. H. PORTER,
C. SMALLEY.